Oct. 24, 1939.  W. P. CAMERON  2,176,988
DISPENSER
Filed April 16, 1938   2 Sheets-Sheet 1

INVENTOR.
William P. Cameron
BY
Emery, Varney, Whittemore & Dr
ATTORNEYS.

Oct. 24, 1939.  W. P. CAMERON  2,176,988
DISPENSER
Filed April 16, 1938  2 Sheets-Sheet 2

INVENTOR.
William P. Cameron
BY
Emery, Varney, Whittemore &c.
ATTORNEYS.

Patented Oct. 24, 1939

2,176,988

UNITED STATES PATENT OFFICE 2,176,988

DISPENSER

William P. Cameron, Philadelphia, Pa., assignor to Seagram-Distillers Corporation, New York, N. Y., a corporation of Delaware Application April 16, 1938, Serial No. 202,406

1 Claim. (Cl. 221—146)

This invention relates to dispensers and more particularly to manually operated dispensers for such articles, for example, as salted nuts at bars and the like, and an object is to provide a sturdy, sanitary device having the improved features of construction hereafter described.

This and other objects are accomplished by the invention illustrated in the accompanying drawings in which, Fig. 1 is a front view in elevation of a dispenser constructed in accordance with one embodiment of this invention;

Figure 1:
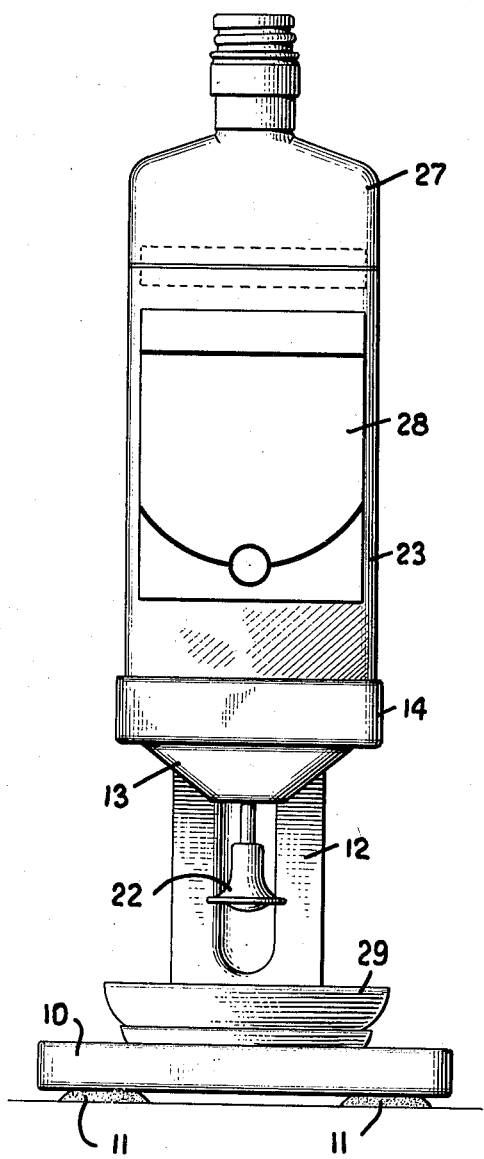
Figure 2:
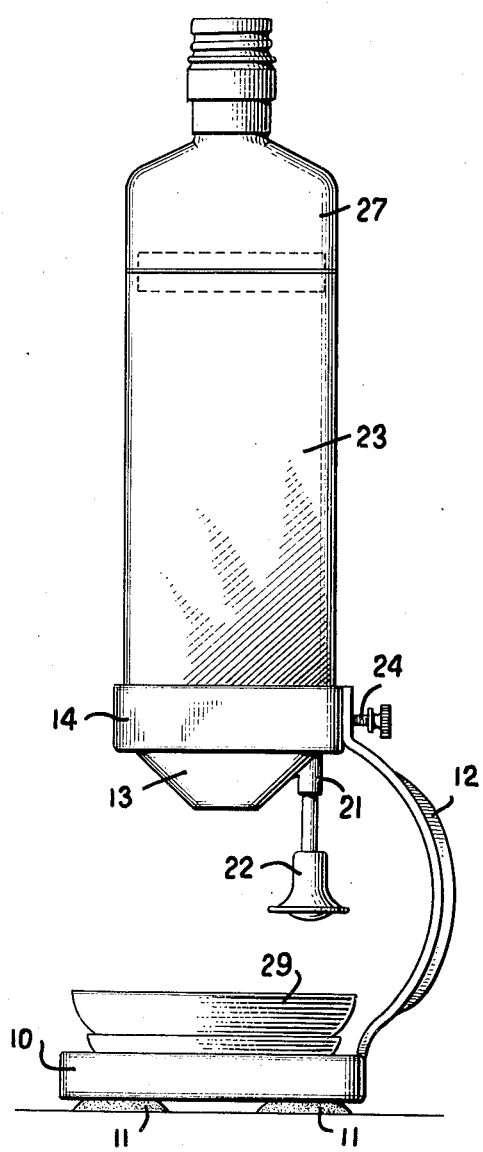
Fig. 2 is a side elevation of the dispenser shown in Fig. 1.
Figure 3:
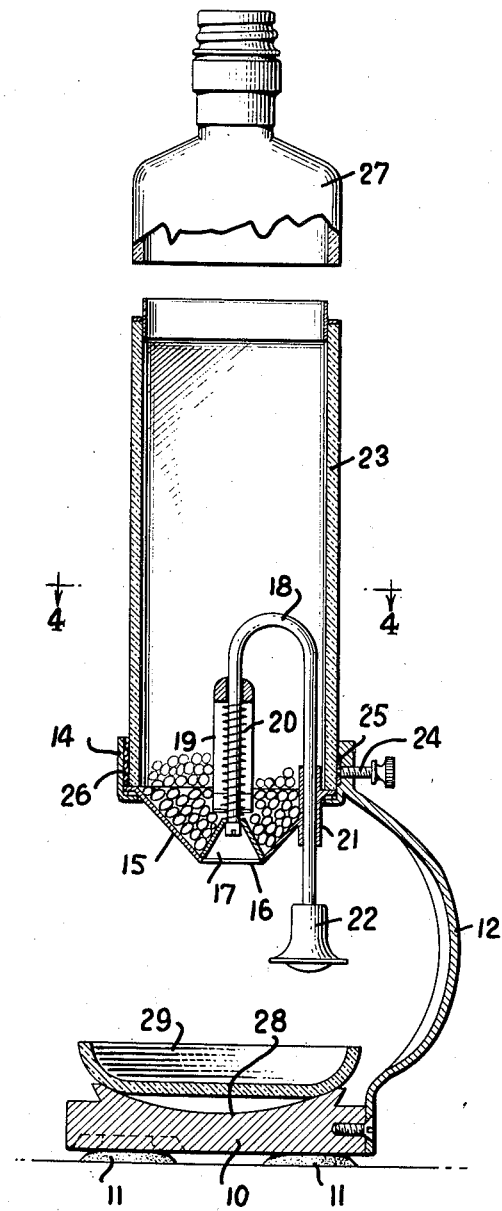
Fig. 3 is a transverse sectional view thereof.
Figure 4:
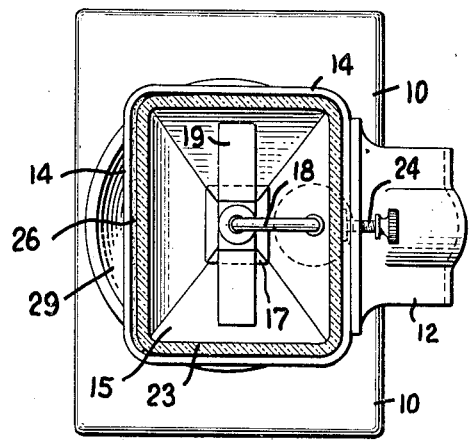
Fig. 4 is a section on the line 4—4 of Fig. 3.
Figure 5:
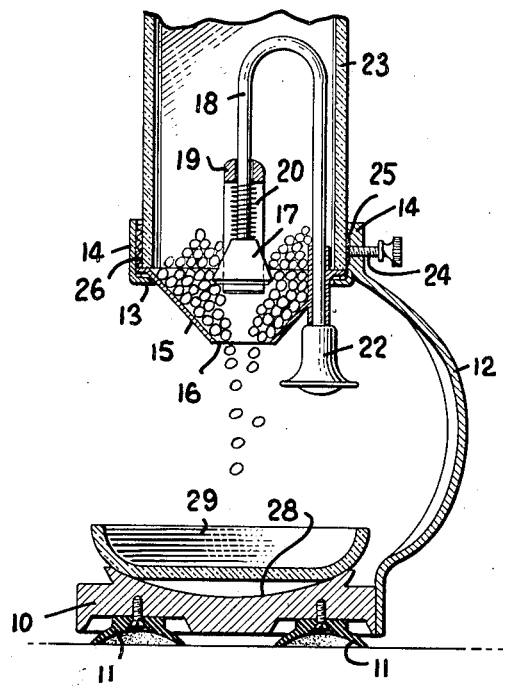
Fig. 5 is a partial sectional view similar to Fig. 3 showing the discharge valve open to permit the discharge of material.

The particular embodiment of the invention which has been chosen for the purposes of illustration comprises a supporting base 10 which is preferably weighted to prevent the dispenser being displaced or jarred by the operation of the valve mechanism hereafter described. As illustrated, the base 10 is provided with rubber pads or feet 11 to prevent marring the surface on which the dispenser stands.

An arm 12, preferably curved as shown, is mounted on and extends upwardly from the base 10 to support a hopper 13 mounted on the upper end of the arm 12 and positioned above the base 10. The hopper comprises an annular, vertically-extending wall 14 and a tapered bottom 15 terminating in a discharge outlet 16 normally closed by a valve 17 secured to the end of a U-shaped valve operating rod 18 having an arm slidably mounted in a yoke 19 supported in the hopper. A spring 20 normally presses the valve 17 downwardly to close the outlet 16. The other arm of the U-shaped valve rod extends downwardly through a sleeve 21 and terminates in a handle 22 in the space between the base 10 and the hopper 15. It will be apparent that by curving the hopper-supporting arm 12 as shown, room is provided for one desiring a handful of peanuts to place his hand in position beneath the hopper 15 when by pushing the handle 22 upwardly the valve 17 is raised and a handful of peanuts or the like is discharged through the opening 16. Release of the handle 22 and spring 20 returns the valve 17 to closed position.

An open-bottom container 23 adapted to hold material such, for example, as salted peanuts, is supported on the hopper and is clamped therein by a clamping screw 24 extending through one side wall. Preferably, the clamping screw 24 has an enlarged bearing plate 25 engaging the side of the container 23 and a pad 26 is located between the opposite wall of the hopper and the container. By this means containers of glass which may, as illustrated, be in the form of bottles, or may have any other form, can be firmly clamped to the hopper without damage. The container has a suitable cover 26 which in the illustrated form is shaped like the top of a bottle.

A container of the type set forth is readily adapted to advertising purposes. For example, as illustrated, the container 23 may have the general form of a glass bottle such as the characteristic bottle of a beverage manufacturer and it may have applied thereto a label 28 similar to the usual label employed on his bottle by such manufacturer.

The base 10, as above indicated, is weighted sufficiently to prevent the dispenser being displaced or knocked over by pushing the valve handle 22 upwardly in obtaining a handful of material. As illustrated, the base 10 also has a rounded recess 28 which can be used to center a dish 29 or the like on the base to catch crumbs.

Various modifications and adaptations of the invention will be apparent and can be made within the scope of the appended claim.

I claim:

The combination in a dispenser of a support, a hopper mounted thereon and forming the bottom of a superimposed container supported by said hopper, means engaging the lower edge of said container for clamping said container in said hopper, a valve yoke mounted in said hopper, a spring-pressed valve supported in said yoke and normally closing a discharge outlet in said hopper, a U-shaped valve-operating rod having one arm extending through said yoke and secured to said valve and the other arm extending downwardly through the wall of said hopper to a position permitting manual actuation thereof to raise said valve and discharge material from said hopper.

WILLIAM P. CAMERON.